Oct. 29, 1935.  T. O. HALL  2,018,717
PROJECTOR LAMP
Filed March 3, 1933  2 Sheets-Sheet 1
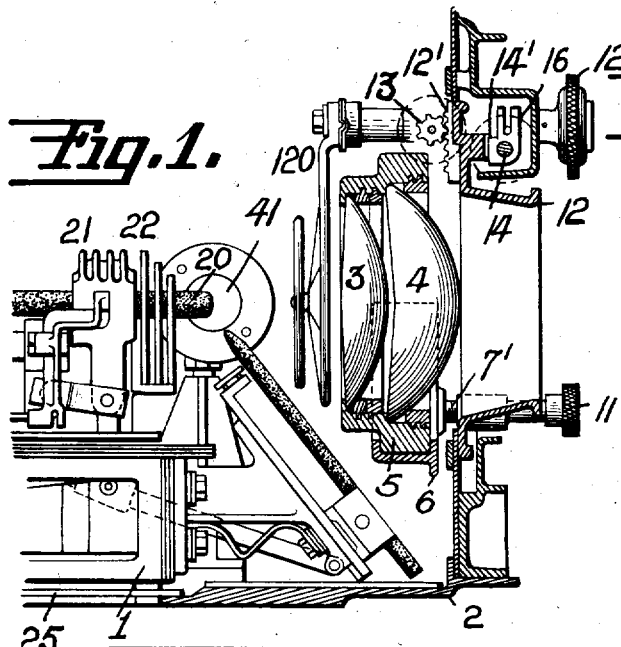
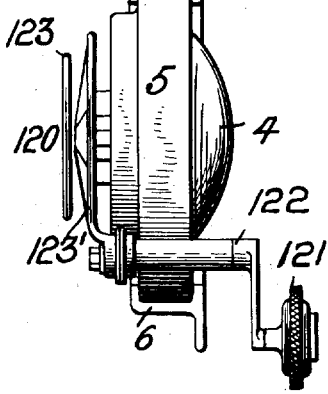
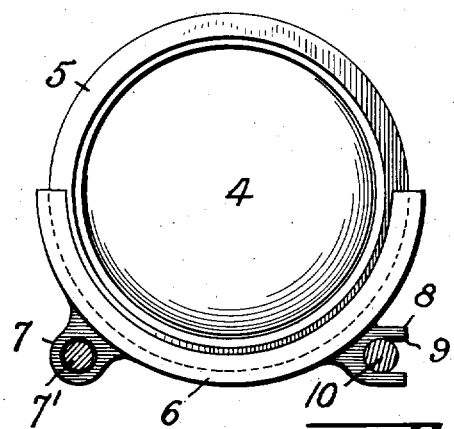
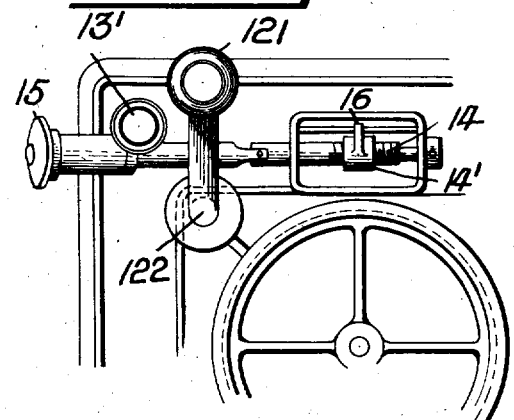
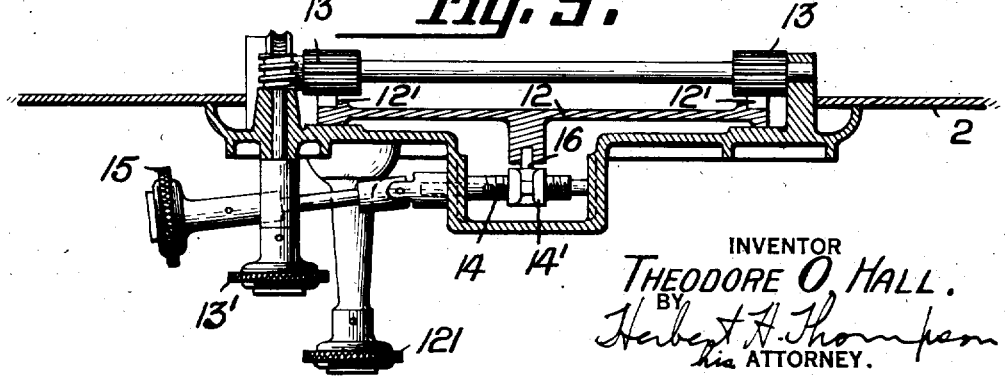
INVENTOR
THEODORE O. HALL.
BY Herbert H. Thompson
his ATTORNEY.

Oct. 29, 1935.  T. O. HALL  2,018,717
PROJECTOR LAMP
Filed March 3, 1933  2 Sheets-Sheet 2
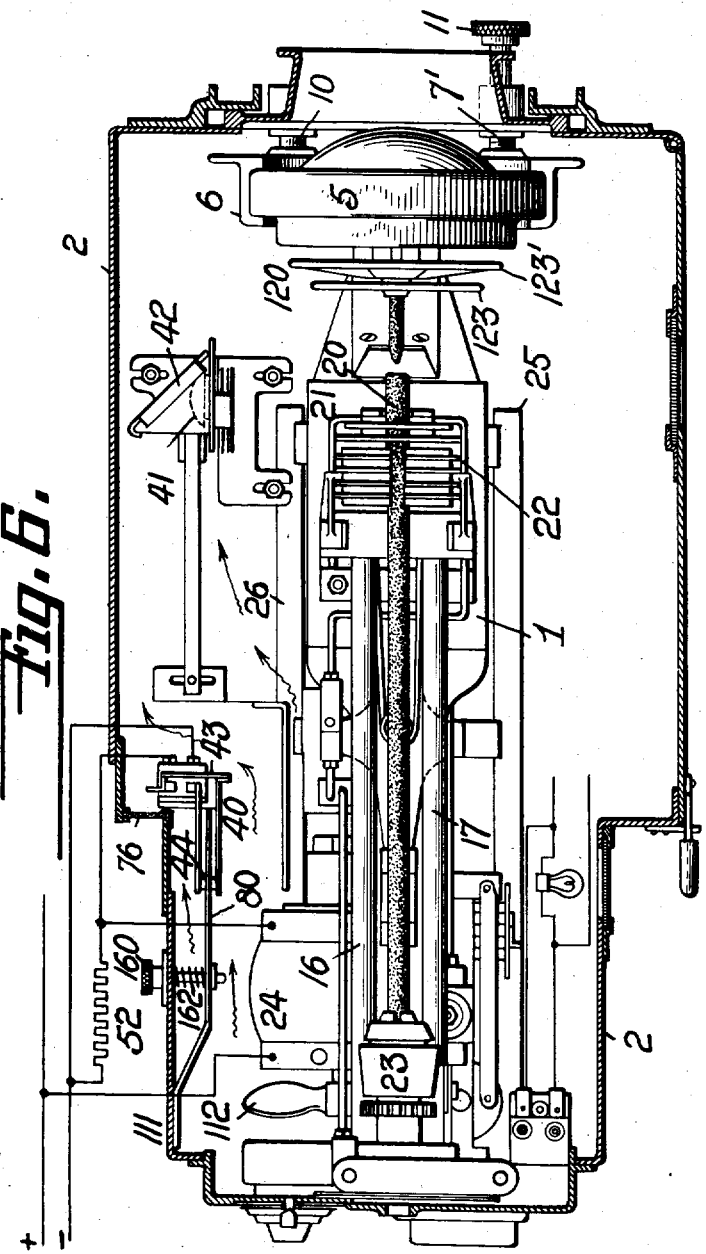
INVENTOR
THEODORE O. HALL.
BY
Herbert H. Thompson
his ATTORNEY.

Patented Oct. 29, 1935

2,018,717

UNITED STATES PATENT OFFICE 2,018,717

PROJECTOR LAMP

Theodore O. Hall, New York, N. Y., assignor to Hall & Connolly, Inc., New York, N. Y., a corporation of New York Application March 3, 1933, Serial No. 659,480

8 Claims. (Cl. 176—51)

This invention relates to projector lamps for throwing a beam of light on a distant scene or screen and more especially to a means for placing the arc source of light and the light or beam collecting means (such as the condenser lenses) in a projector light for motion pictures so that the light may be in the exact position desired with respect to the beam collecting means. To this end I prefer to place the arc source in approximately the proper position, but to so mount the beam collector that it may be adjusted in all planes to secure the focus desired.

Referring to the drawings, showing one form my invention may assume.

Fig. 1 is a vertical section through the forward end of my projector lamp housing.

Fig. 2 is a top view of the condenser lens mounting.

Fig. 3 is a face view of the lens mounting.

Fig. 4 is a front view of the lamp box showing the handles for adjusting the lens.

Fig. 5 is a sectional detail of the adjusting mechanism for the lens.

Fig. 6 is a plan view of the projector lamp, the housing being in section.

Fig. 7 is a plane view of the thermostat for governing the feed.

Fig. 8 is a front elevation of the same, showing the optical means for positioning the arcing tip of the positive electrode.

According to my invention, the projector lamp proper, I, may be slid into the lamp box 2, on trackways 25, 26, to its approximate position and accurate focusing and adjusting of the beam may be effected by adjusting the beam focusing or collecting means with respect thereto, such as the condenser or projector lenses 3 and 4. For this purpose the lenses or other beam focusing devices are clamped in an annular holder 5 which rests in a semicircular support 6. Said support is provided at the bottom with a pair of lugs 7 and 8, the former being threaded to receive threaded shaft 7' and the latter having a notch 9 to receive guide shaft 10. By turning knob 11 on shaft 7', the lenses may be readily moved toward or away from the lamp to vary the focus.

For positioning the lenses in a vertical plane, the entire supporting framework 12 is adjustable vertically by means of racks 12' thereon and pinions 13 (Figs. 1 and 5) journalled on the stationary frame and rotated by a thumb piece 13'. For lateral adjustment there is provided a threaded shaft 14 turned by thumb piece 15 and on which is threaded a travelling nut 14'. Said nut has a tongue 16 at one side to engage a slot in a projection from frame 12 so that lateral movement of said nut carries the frame with it but free vertical adjustment of the frame may take place. For analogous reasons, the pinions 13 are elongated to permit lateral movement of the pinions without getting out of mesh with their racks.

The positive electrode 20 is shown as slidably supported at its forward end by the holder 21 provided with cooling ribs 22. At its rear, the electrode is clamped in a rotatable holder 23 which is slowly advanced to feed the electrode along hollow guide rods 16 and 17. For supplying the power for feeding and rotating the electrode, there is provided a motor 24, the details of its drive to the electrode holders being described in detail in my prior application Serial No. 593,004 filed February 15, 1932, for Automatic projector lamps of which this application is a division.

According to my invention the positive electrode is continuously rotated and fed but the rate of feed is varied by a thermostat 40 to maintain the positive crater at the focus of the optical system. Preferably the slow speed of the motor is adjusted so as to be slightly less than the normal rate of consumption, while the high speed is somewhat greater so that the thermostat will be called into action intermittently to vary the feed between these two limits. Light from the arc is concentrated by a lens 41 and reflected by an adjustable mirror 42 onto the thermostat strip 43 thus closing the contacts 44 when the beam from the arc strikes the same. When said contacts are closed a resistance 52, normally in series with the motor, is shunted out, directly or indirectly, thus speeding up the motor and increasing the rate of feed.

My preferred construction of thermostat is shown in Figs. 7 and 8. The main thermostat strip is shown at 41 which comprises the usual bimetallic strip which bends on changes of temperature. Said strip is bent at right angles at one end and rigidly clamped to a metal post 65 which may be rotatably adjusted and clamped in the base 66 by a nut 70 to vary the position of the strip. At its outer end there is riveted or otherwise secured to said strip a rigid metallic contact arm 67 preferably of aluminum and having a contact 44 at the end thereof. The cooperating contact arm 68 is secured to a second post 69 adjustably clamped in the base 66 by nut 70'. Arm 68, however, is also of bimetallic thermostat metal and carries at its outer end complementary contact 44'. The beam from the arc, however, only strikes the strip 41, the other strip being used to compensate for changes in temperature of the air in the thermostat housing. Being at right angles to the beam, it remains wholly unaffected thereby. Each of the posts 65 and 69 may be provided with plug ends 75—75' so that the thermostat may be plugged into and detached from the lamp house at will. The thermostat housing as a whole is supported on a hinged or resilient arm 80 secured at one end 111 only to the lamp structure 2, giving it an adjustable mounting so that the position of the thermostat may be changed by adjusting nut 160 against coil spring 162 to vary the normal position of the positive crater.

I also mount in the lamp housing adjacent the thermostat a frosted window 76 on which the image of the arc and tip of the positive electrode may be seen. As the arc burns back, the image will move along the ground glass over the scale 77. A pointer 78 may be provided to show the point at which the arc image strikes the thermostat so as to start the feed. In setting up the lamp, the thermostat is adjusted until the arc image lies in the desired position on the scale 77 and the lenses are then adjusted so that the correct beam is obtained with the arc in that position.

I also prefer to cool the housing 12 for the thermostat as well as the interior of the lamp box and the feeding mechanism. Air is supplied for both purposes by a fan 112 on the shaft of the motor 24. The air from said fan not only passes through the lamp structure proper but is guided to both sides of the thermostat as indicated by the arrows in Fig. 6. This assures proper actuation of the thermostat under all conditions, since without my invention the thermostat as a whole may become so hot that the arc beam will not make a sufficient temperature differential to close the contacts. A shutter 120 may be provided to shut off the light from the screen or stage quickly. A handle 121 secured to the shaft 122 on which the shutter is pivoted is shown for operating the same. The shutter is shown as made of a pair of separated discs 123 and 123' so that the heat will not reach the lens mounting.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention what I claim and desire to secure by Letters Patent is as follows:—

1. In a projector lamp, a relatively fixed arc light source, a beam collecting means, a frame slidably mounted for up and down and transverse movement with respect to the lamp, and means for adjusting said frame including means for raising and lowering said frame, means for adjusting said frame laterally, and a mounting for said collecting means adjustably secured to said frame for movement toward and away from the light source.

2. In an arc projector lamp, means for feeding the electrodes thereof, a thermostat for controlling said means, an arc imaging means, means adjacent said thermostat for adjusting the position of the thermostat to locate the arc with reference to said imaging means, a condenser lens, and means for adjusting said lens in all planes with respect to said lamp.

3. In a projector lamp, a relatively fixed arc light source, a beam collector, and means for adjustably mounting the same including a frame slidably mounted up and down and transverse of the lamp, a knob for accurately adjusting said frame up and down, a knob for accurately adjusting said frame laterally, a collector mounting adjustably secured to said frame for movement toward and away from the light source and a knob for so adjusting said mounting.

4. In an arc projector lamp, a housing, a lamp structure slidably mounted therein, electrode feeding means thereon, a thermostat independently mounted on said housing for governing the feed and position of one electrode, an arc imaging means also mounted in said housing adjacent said thermostat, means for adjusting the thermostat to locate the arc with reference to said imaging means, a condenser lens, and means for adjusting said lens in all planes with respect to said lamp to properly locate the same with respect to the arc.

5. In an arc projector lamp, means for feeding the electrodes thereof including means for maintaining the arcing tip of one electrode in a fixed position with respect to said lamp, an independently mounted arc imaging means adjacent said second mentioned means, means for adjusting the position of the arc positioning means to locate the arc with respect to said imaging means, a condenser lens, and means for adjusting said lens in all planes with respect to said lamp.

6. In a projector lamp, the combination with a housing therefor having a light emitting aperture at the front thereof, and an adjustable arc lamp within said housing, of a beam collector adjustably mounted with reference to said aperture including a frame slidably mounted in said housing for up and down and lateral movement, a vertical rack thereon, a pinion journalled in said housing for moving said rack up and down, a threaded shaft journalled transversely of said opening, a travelling nut thereon having a slidable tongue and groove connection to said frame to move the same laterally, a pair of spaced rods mounted in said frame, at least one of said rods being threaded, and a collector mounting supported and adjustably mounted by said rods for movement toward and away from said frame.

7. In a projector arc lamp, a thermostatic means for governing the feed having a thermostatic strip adapted to intercept a beam from the arc when the arc is in a predetermined position, a ground glass screen adjacent thereto, and a lens for throwing an image of the arc on the thermostat and screen.

8. In a projector arc lamp, a thermostatic means for governing the feed having a thermostatic strip adapted to intercept a beam from the arc when the arc is in a predetermined position, a ground glass screen adjacent thereto, a lens for throwing an image of the arc on the thermostat and screen, and an indicator visible on said screen to show when the beam is striking the thermostat.

THEODORE O. HALL.